United States Patent
Ando et al.

(10) Patent No.: US 6,979,161 B2
(45) Date of Patent: Dec. 27, 2005

(54) BOLT STRUCTURE FOR USE WITH A MAGNESIUM ALLOY MEMBER FOR TIGHTENING MAGNESIUM ALLOY MEMBERS WITH EACH OTHER OR WITH A HETEROGENENOUS MATERIAL

(75) Inventors: Katsutoshi Ando, Wako (JP); Eiji Suzuki, Wako (JP); Kenichi Kitayama, Wako (JP); Yoichiro Inaba, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 476 days.

(21) Appl. No.: 10/020,514

(22) Filed: Dec. 18, 2001

(65) Prior Publication Data

US 2002/0127083 A1 Sep. 12, 2002

(30) Foreign Application Priority Data

Dec. 19, 2000 (JP) ........................ 2000-385926

(51) Int. Cl.$^7$ ............................. F16B 33/00; F16B 35/00
(52) U.S. Cl. .................... 411/368; 411/366.1; 411/378; 411/902; 411/914
(58) Field of Search ................................ 411/378, 427, 411/366.1, 368, 901, 902, 914

(56) References Cited

U.S. PATENT DOCUMENTS

| | | | | |
|---|---|---|---|---|
| 3,099,083 A | * | 7/1963 | DeLong | 411/914 |
| 4,074,011 A | * | 2/1978 | Teramae et al. | 411/914 |
| 4,114,505 A | * | 9/1978 | Loeser et al. | 411/914 |
| 4,165,242 A | * | 8/1979 | Kelly et al. | 411/914 |

FOREIGN PATENT DOCUMENTS

| | | |
|---|---|---|
| JP | 58-81211 | 5/1983 |
| JP | 60-139909 | 7/1985 |
| JP | 2-102009 | 8/1990 |
| JP | 10-202784 | 8/1998 |

\* cited by examiner

*Primary Examiner*—Neill Wilson
(74) *Attorney, Agent, or Firm*—Arent Fox Kintner Plotkin & Kahn (57) ABSTRACT

The present invention provides for a bolt structure for use with a magnesium alloy member that can insulate between magnesium alloy members and steel or other bolts without lowering the bolt shaft power, and prevent occurrence of electrolytic corrosion with an electrolyte such as water. A cationic electrodeposition coating is also provided for the bolts structure, said coating having a film thickness of 15 $\mu$m or more is provided at least on the surface of the magnesium alloy member contacting with a bolt head, a powder coating having a film thickness of 40 to 150 $\mu$m is provided on the surface of the cationic electrodeposition coating, zinc-nickel plating and then cosmer treatment are carried out on the bolt, and an alumite-treated aluminum washer is interposed between the bolt head and the magnesium alloy member.

6 Claims, 6 Drawing Sheets

(5 of 6 Drawing Sheet(s) Filed in Color)

Fig. 1A
Example 1

Fig. 1B
Example 2

Fig. 1C
Example 3

Fig. 1D
Example 4

Fig. 1E
Example 5

Fig. 2A
Example 6

Fig. 2B
Example 7

Fig. 2C
Example 8

Fig. 2D
Example 9

Fig. 3A
Comparative Example 1

Fig. 3B
Comparative Example 2

Fig. 3C
Comparative Example 3

Fig. 3D
Comparative Example 4

Fig. 3E
Comparative Example 5

Fig. 3F
Comparative Example 6

Fig. 4A
Comparative Example 7

Fig. 4B
Comparative Example 8

Fig. 4C
Comparative Example 9

Fig. 4D
Comparative Example 10

Fig. 4E
Comparative Example 11

Fig. 4F
Comparative Example 12

Fig. 5A
Examples 1 and 4

Fig. 5B
Comparative Example 8

Fig. 6

BOLT STRUCTURE FOR USE WITH A MAGNESIUM ALLOY MEMBER FOR TIGHTENING MAGNESIUM ALLOY MEMBERS WITH EACH OTHER OR WITH A HETEROGENENOUS MATERIAL

BACKGROUND OF THE INVENTION

The present invention relates to a bolt tightening structure of a magnesium alloy members, and more particularly to a technology for preventing occurrence of electrolytic corrosion of the magnesium alloy member.

Recently, in the automobile industry, as the concern about environmental problems increases, a further improvement of fuel economy has been demanded. To meet such demand, in the automobile industry, it is required to reduce the weight of the car body, and magnesium alloys are widely used in automotive parts owing to their lightest weight among practical metals. More lately, in particular, they are applied in locations where very high corrosion resistance is required such as exterior and structural parts.

However, since the magnesium alloy is the basest practical alloy, when it is tightened with a heterogeneous metal such as iron or aluminum, electrolytic corrosion is likely to occur in the presence of moisture containing electrolyte. Especially for automobiles used outdoors, electrolytic corrosion is extremely promoted by the function of electrolyte contained in rainwater, seawater, or snow-melting salt, possibly causing breakage or damage of parts.

Japanese Laid-open Patent No. 5-302614 proposes a technology for preventing electrolytic corrosion by interposing a paper washer coated with resin between a magnesium alloy member and a steel bolt so as to avoid contact between the bolt and the magnesium alloy member. However, as the bolt corrodes, corrosion products flow out onto the magnesium alloy to cause electrolytic corrosion, and therefore it was impossible to apply in the position where corrosion resistance was required. It may be also considered to insulate between a bolt head and a magnesium alloy member by means of a resin washer, but the resin creeps by heat in coating, and the bolt shaft power lowers, and retightening is required, and hence it is not practicable. Moreover, recently, automakers in Europe have developed techniques for interposing an organic material containing inorganic fillers between a magnesium alloy member and a bolt. In such techniques, however, after 20 cycles of composite corrosion test by salt spray, occurrence of electrolytic corrosion was noted, and it was far from satisfaction of recent demands.

BRIEF SUMMARY OF THE INVENTION

It is hence an object of the invention to provide a bolt tightening structure of a magnesium alloy member capable of insulating between a magnesium alloy member and a steel bolt without lowering the bolt shaft power, and preventing occurrence of electrolytic corrosion even in contact with electrolyte such as water.

The present invention is a bolt tightening structure of a magnesium alloy member for tightening magnesium alloy members with each other or a magnesium alloy member and a heterogeneous material by means of a bolt, wherein a cationic electrodeposition coating having a film thickness of 15 μm or more is provided at least on the surface of the magnesium alloy member contacting with a bolt head, a powder coating having a film thickness of 40 to 150 μm is provided on the surface of the cationic electrodeposition coating, zinc-nickel plating and then cosmer treatment are carried out on the bolt, and an alumite-treated aluminum washer is interposed between the bolt head and the magnesium alloy member.

As investigated by the present inventors, without cationic electrodeposition coating, even if a powder coating is applied in a sufficient thickness, the adhesion of the powder coating is poor, and local surface corrosion or electrolytic corrosion is likely to occur. In contrast, when a cationic electrodeposition coating is applied, the adhesion of the coating is sufficient, and such defect does not occur. However, when the film thickness of the cationic electrodeposition coating is less than 15 μm corrosion resistance is extremely lowered, and hence the film thickness is preferably 15 μm or more. With the cationic electrodeposition coating only, the cationic electrodeposition coating film may be scratched by torque when tightening a bolt, and electrolytic corrosion is likely to grow from flaws. It is therefore essential to apply powder coating after cationic electrodeposition coating as proposed in the present invention. If the film thickness of the powder coating is less than 40 μm the coating appearance is extremely deteriorated and the film thickness is locally reduced to cause electrolytic corrosion easily. In contrast, if the film thickness is over 150 μm, the shaft power is lowered when tightening the bolt.

On the other hand, the bolt is treated by zinc-nickel plating and then cosmer process. Generally, for a bolt used in tightening of a magnesium alloy member, tin-zinc plating is preferable because the potential difference from magnesium is small. However, tin-zinc plating is not so superior in corrosion resistance, and the bolt corrode easily. When the bolt corrode, corrosion products flow to cause electrolytic corrosion between the corrosion products and magnesium alloy. The bolt treated by zinc plating and cosmer process is superior in corrosion resistance, and there is no problem in tin-zinc plating, and such bolt is easily available commercially.

As far as a bolt is made of steel, when used alone, potential difference from magnesium alloy cannot be eliminated completely. When tightening the bolt, moreover, due caution is needed not to scratch the coat surface by the bolt head. From such viewpoint, it is required to use an insulating washer in order to protect and insulate the magnesium alloy member. In this case, considering the insulation, corrosion resistance, and bolt shaft power, an alumite-treated washer are ideal. Alternatively, an iron or aluminum alloy washer treated by providing a cationic electrodeposition coating having a film thickness of 15 μm or more can also be used. In this case, if the film thickness of the cationic electrodeposition coating is less than 15 μm, current may locally pass, and depending on the bolt tightening torque or number of times of repetition of tightening, there is a slightly possibility of occurring electrolytic corrosion on the magnesium alloy member.

BRIEF DESCRIPTION OF THE SEVERAL VIEWS OF THE DRAWINGS

The Patent or Patent application file contains at least one drawing executed in color. Copies of this Patent or Patent application with color drawings will be provided by the Office upon the request and payment of the necessary fee.

BEST MODE FOR CARRYING OUT THE INVENTION

Preferred embodiments of the present invention are described below.

1. Magnesium Alloy Member

A magnesium alloy member preferably contains Al in an amount of 5% by weight or more. If the content of Al is less than 5% by weight, corrosion resistance of the magnesium alloy member is lowered, and corrosion resistance of coated surface decreases, and it is not suited to bolt tightening. The surface of the magnesium alloy member is preferred to be treated by any one of chromic acid chrome treatment (chromate treatment), chromium phosphate treatment, and manganese phosphate treatment. Cr or Mn is contained in the surface of the magnesium alloy member by such treatment, and by the oxidation and reduction reaction of these elements (change of valence), oxidation reaction of magnesium is suppressed, so that electrolytic corrosion may be prevented effectively.

Powder coating applied on the surface of a cationic electrodeposition coating preferably contains epoxy resin and polyester resin as a principal component. Considering outdoor use, these resins are highest in light fastness and superior in corrosion resistance.

2. Bolt

After zinc-nickel plating and before cosmer treatment, a bolt is preferred to be treated by chromate treatment. As a result, corrosion resistance of the bolt is further enhanced, and electrolytic corrosion of the magnesium alloy member by corrosion products can be effectively prevented. Cosmer treatment is generally a process for coating bolt surface with ethylene-acrylic acid copolymer resin dispersion added water dispersing silica, silane coupling agent, and water dispersing chromium compound.

3. Washer

In order to prevent tearing of an alumite layer and assure insulation when tightening bolt, the thickness thereof is preferred to be 10 $\mu$m or more, and more preferably 30 $\mu$m or more. Further, by coating adhesive or thermoplastic resin sealer on the bolt tightening area, infiltration of electrolyte is prevented and resistance to electrolytic corrosion is enhanced.

4. Tightening Part

In the present invention, material of part to be tightened with the magnesium alloy member is assumed mainly to be iron or aluminum alloy. Of such tightening part, at least the surface contacting with the magnesium alloy member is preferably treated by cationic electrodeposition coating. The film thickness thereof is preferred to be 15 $\mu$m or more. The reason is the same when applying cationic electrodeposition on the magnesium alloy member. When an iron part is treated by zinc plating or zinc-nickel plating prior to such coating, the corrosion resistance may be further enhanced.

EXAMPLES

Examples

In the following, the present invention is further explained in detail by referring to Examples.

1. Preparation of Test Piece

In a plate material of magnesium alloy (AM60B or AZ91D) of 70 mm in width, 150 mm in height and 3 mm in thickness, 6 holes of 9 mm in diameter were formed, and burrs were removed sufficiently. Such magnesium alloy plate was prepared as a test piece of Examples 1 to 5, and was pretreated and coated as shown in Table 1. In chromate treatment, chromic acid chrome treatment solution (trade name: NH35, produced by Norsk Hydro Co., Ltd.) was used and chrome loading was 0.5 g/m². In manganese phosphate treatment, Mag Plus treating solution (trade name), produced by Ebina Electric Co., Ltd., was used. In cationic electrodeposition coating, Power Top V50 (trade name) produced by Nippon Paint Co., Ltd., was used, and the film thickness was 25 $\mu$m or 15 $\mu$m. In powder coating, an epoxy/polyester paint (trade name: Powdux P60, produced by Nippon Paint Co., Ltd.) was used, and the film thickness thereof was 100 $\mu$m or 40 $\mu$m.

As a bolt, a steel flanged bolt of 8 mm in diameter, being treated by zinc-nickel plating, colored chromate treatment, and cosmer treatment (Strength 7T, produced by Ohashi Technica Co., Ltd.), was used. As a washer, a light alumite washer made of aluminum, being treated by sulfuric acid treatment and sealed by nickel acetate method (JIS A5182, produced by Ohashi Technica co., Ltd.), was used. The thickness of an alumite layer of the washer was set at 10 $\mu$m or 30 $\mu$m.

2. Bolt Tightening

As a tightening part, an iron plate in which screw holes suited to the bolt diameter were formed, zinc phosphate treatment was carried out and a cationic electrodeposition coating having a film thickness of 15 $\mu$m was provided, was used. A magnesium alloy test piece was put on the iron plate, and tightened by a bolt and a washer. The bolt was tightened by an air impact wrench to specified torque. Lowering of shaft power of the bolt after tightening was investigated. With respect to the bolt shaft power test, after tightening the bolt to specified torque, it was held at 100° C. for 60 minutes, and then the shaft power thereof was measured. In Table 1, the following criteria were used: cases where the measured value was lower than the initial shaft power by more than 20%: X; and cases where it was within 20%: o. When lowering of the shaft power is within 20%, retightening process can be omitted by setting the initial shaft power slightly higher.

3. Salt Spray Test

The test pieces after bolt tightening were evaluated by salt spray test to investigate about swelling of the coat film and occurrence of electrolytic corrosion near a bolt tightening area in the magnesium alloy test piece. The results are shown in Table 1. In the salt spray test, 5% NaCl solution was sprayed to the test piece at a flow rate of 1.5 ml/min for 1200 hours. "Swelling of coat film" refers as a state in which the coat film near a bolt tightening area of a magnesium alloy member changes in appearance due to corrosion of the lower side thereof. "Electrolytic corrosion" refers as a state in which a large-scale pitting corrosion accompanied by peeling of a coat film occurs near a bolt tightening area. Further, it was investigated whether corrosion occurred at the edge of the test piece due to flow-out of corrosion products produced by corrosion of the bolt, and the results are also shown in Table 1.

TABLE 1

| Ordinary torque tightening | Example 1 | Example 2 | Example 3 | Example 4 | Example 5 |
|---|---|---|---|---|---|
| Magnesium alloy member | | | | | |
| Material | AM60B | AM60B | AM60B | AM60B | AZ91D |
| Chromate treatment | Treated | | Treated | Treated | Treated |
| Manganese phosphate treatment | | Treated | | | |
| Cationic electrodeposition coating (25 $\mu$m) | Treated | Treated | | Treated | Treated |
| Cationic electrodeposition coating (15 $\mu$m) | | | Treated | | |
| Powder coating (100 $\mu$m) | Treated | Treated | | Treated | Treated |
| Powder coating (40 $\mu$m) | | | Treated | | |
| Washer | | | | | |
| Alumite treatment (10 $\mu$m) | Treated | Treated | Treated | | Treated |
| Alumite treatment (30 $\mu$m) | | | | Treated | |
| Bolt | | | | | |
| ZnNi plating/Cosmer treatment | Treated | Treated | Treated | Treated | Treated |
| Salt spray test result | | | | | |
| Swelling of coat film in bolt tightening area | None | None | None | None | None |
| Electrolytic corrosion of material in bolt tightening area | None | None | None | None | None |
| Corrosion at material edge | None | None | None | None | None |
| Tightening performance | | | | | |
| Decrease of bolt shaft power | None | None | None | None | None |
| Overall evaluation | ○ | ○ | ○ | ○ | ○ |

As shown in Table 1, in Examples 1 to 5, after bolt tightening, the shaft power was not lowered at all. FIG. 1 shows photographs of test pieces after salt spray test according to Examples 1 to 5. As shown in Table 1 and FIG. 1, in the magnesium alloy test pieces, swelling of coat film and electrolytic corrosion in the bolt tightening area did not occur at all, and edge corrosion was not recognized.

3. Bolt Over-Torque Tightening and Salt Spray Test

The same magnesium alloy plates as in Examples 1 to 5 were prepared as test pieces in Examples 6 to 9, and were pretreated and coated as shown in Table 2. The magnesium alloy test pieces were tightened to iron plates in the same manner as in the above Examples. At this time, the bolt was tightened to torque of 1.2 times that of the above Examples, and this over-torque tightening and loosening were repeated 10 times. After the same salt spray test, swelling of coat film near the bolt tightening area of the magnesium alloy test piece, presence or absence of electrolytic corrosion, and corrosion at the edge of the test piece were investigated. The results are also shown in Table 2.

TABLE 2

| Over-torque tightening reteated 10 times | Example 6 | Example 7 | Example 8 | Example 9 |
|---|---|---|---|---|
| Magnesium alloy member | | | | |
| Material | AM60B | AM60B | AM60B | AM60B |
| Chromate treatment | Treated | Treated | Treated | Treated |
| Cationic electrodeposition coating (25 $\mu$m) | | | Treated | |
| Cationic electrodeposition coating (15 $\mu$m) | Treated | Treated | | Treated |
| Powder coating (100 $\mu$m) | Treated | | | |
| Powder coating (40 $\mu$m) | | Treated | Treated | Treated |
| Washer | | | | |
| Alumite treatment (10 $\mu$m) | Treated | | Treated | Treated |
| Alumite treatment (30 $\mu$m) | | Treated | | |
| Bolt | | | | |
| ZnNi plating/cosmer treatment | Treated | Treated | Treated | Treated |
| Salt spray test result | | | | |
| Swelling of coat film in bolt tightening area | None | None | Present | Present |
| Electrolytic corrosion of material in bolt tightening area | None | None | None | None |
| Corrosion at material edge | None | None | None | None |
| Overall evaluation | ◎ | ◎ | ○ | ○ |

FIG. 2 shows photographs of test pieces after salt spray test according to Examples 6 to 9. As shown in Table 2 and FIG. 2, in the magnesium alloy test pieces of Examples 6 and 7, swelling of coat film in bolt tightening area and electrolytic corrosion did not occur at all, and edge corrosion was not recognized. In contrast, in the magnesium alloy test pieces of Examples 8 and 9, swelling of coat film in bolt tightening area was recognized. It is estimated to be due to effects of a powder coating having a thickness of 40 $\mu$m and an alumite layer of washer having a thickness of 10 $\mu$m.

Overall evaluations were carried out by the above results, and the evaluations are shown in Table 1 and Table 2. In the overall evaluation, the following criteria were used: cases where a problem occurred in any one of the items in bolt tightening at specified torque: X; cases where no problem occurred at specified torque: o; and cases where no problem occurred at over-torque: ◎. As a result, the result was ◎ in Examples 6 and 7, and o in all other Examples.

Comparative Examples

The same magnesium alloy plates as in the above Examples were prepared as test pieces of Comparative Examples 1 to 12. These test pieces were pretreated and coated as shown in Table 3 and Table 4. Using bolts and washers specified in Table 3 and Table 4, and the same iron plates as in the above Examples, the bolt was tightened to specified torque. Herein, "chelating treatment" shown in Table 3 and Table 4 is a kind of pretreatment for coating, and it refers as a treatment for chelating Mg component by treating a magnesium alloy plate with azole having a hydrazine structure. Other pretreatments and coating conditions were the same as in the above Examples.

TABLE 3

| Ordinary torque tightening | Comparative Example 1 | Comparative Example 2 | Comparative Example 3 | Comparative Example 4 | Comparative Example 5 | Comparative Example 6 |
|---|---|---|---|---|---|---|
| Magnesium alloy member | | | | | | |
| Material | AM60B | AM60B | AM60B | AM60B | AM60B | AM60B |
| Chromate treatment | Treated | Treated | | Treated | Treated | Treated |
| Chelating treatment | | | Treated | | | |
| Cationic electrodeposition coating (25 μm) | Treated | | | Treated | Treated | Treated |
| Powder coating (100 μm) | | Treated | Treated | Treated | Treated | Treated |
| Powder coating (200 μm) | | | | | | |
| Washer | | | | | | |
| Alumite treatment (30 μm) | Treated | Treated | Treated | | Treated | Treated |
| Iron | | | | | Iron Washer | |
| Resin | | | | | | |
| Bolt | | | | | | |
| ZnNi plating/cosmer treatment | Treated | Treated | Treated | Treated | | |
| Dacro treatment | | | | | Treated | |
| Chrome plating | | | | | | Treated |
| Zinc plating | | | | | | |
| Tin-zinc plating | | | | | | |
| Salt spray test result | | | | | | |
| Swelling of coat film in bolt tightening area | Present | Present | Present | Present | None | None |
| Electrolytic corrosion of material in bolt tightening area | Present | Present | Present | None | None | None |
| Corrosion at material edge | None | None | None | None | Present | Present |
| Tightening performance | | | | | | |
| Decrease of bolt shaft power | None | None | None | None | None | None |
| Overall evaluation | x | x | x | x | x | x |

TABLE 4

| Ordinary torque tightening | Comparative Example 7 | Comparative Example 8 | Comparative Example 9 | Comparative Example 10 | Comparative Example 11 | Comparative Example 12 |
|---|---|---|---|---|---|---|
| Magnesium alloy member | | | | | | |
| Material | AM60B | AM60B | AM60B | AM60B | AM60B | AM60B |
| Chromate treatment | Treated | Treated | Treated | Treated | Treated | Treated |
| Chelating treatment | | | | | | |
| Cationic electrodeposition coating (25 μm) | Treated | Treated | Treated | Treated | Treated | |
| Powder coating (100 μm) | Treated | Treated | | | Treated | Treated |
| Powder coating (200 μm) | | | Treated | | | |
| Washer | | | | | | |
| Alumite treatment (30 μm) | Treated | Treated | Treated | | | Treated |
| Iron | | | | | | |
| Resin | | | | | Resin Washer | |
| Bolt | | | | | | |
| ZnNi plating/cosmer treatment | | | Treated | Treated | Treated | |
| Dacro treatment | | | | | | |
| Chrome plating | | | | | | |
| Zinc plating | Treated | | | | | |
| Tin-zinc plating | | Treated | | | | Treated |
| Salt spray test result | | | | | | |
| Swelling of coat film in bolt tightening area | None | None | None | None | Present | Present |
| Electrolytic corrosion of material in bolt tightening area | None | None | None | None | Present | Present |
| Corrosion at material edge | Present | Present | None | None | None | Present |
| Tightening performance | | | | | | |
| Decrease of bolt shaft power | None | None | Present | Present | None | None |
| Overall evaluation | x | x | x | x | x | x |

As a washer, an iron washer and a resin (plastic) washer were used, except for the almite washer having an alumite layer of 30 μm. As a bolt, bolts treated by Dacro treatment, chrome plating, zinc plating, and tin-zinc plating were used, except for the bolts used in the above Examples. "Dacro treatment" refers as a process treated by dacrotized treating solution (produced by Dacro Shamrock Japan Co., Ltd.).

With respect to these test pieces of Comparative Examples, after salt spray test was carried out in the same condition as that in Examples, swelling of coat film near the bolt tightening area of the magnesium alloy test piece, presence or absence of electrolytic corrosion, and corrosion at the edge of the test piece were investigated. The results are shown in Table 3 and Table 4, and photographs of test pieces after salt spray test are shown in FIG. 3 and FIG. 4. In the following, the Comparative Examples will be analyzed.

Figure 1A:
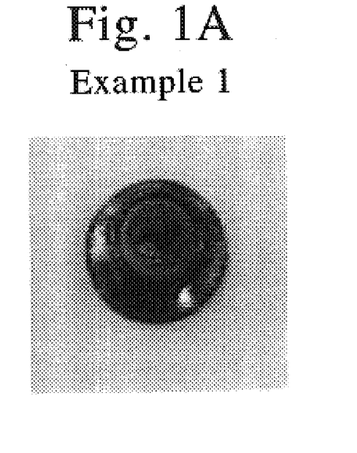
FIG. 1 shows photographs of bolts after salt spray test according to Examples 1 to 5 of the present invention.
Figure 1B:
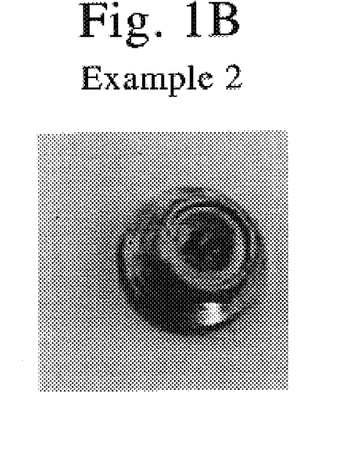
Figure 1C:
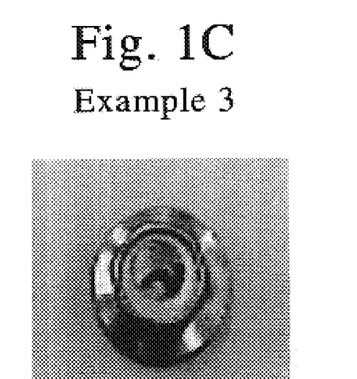
Figure 1D:
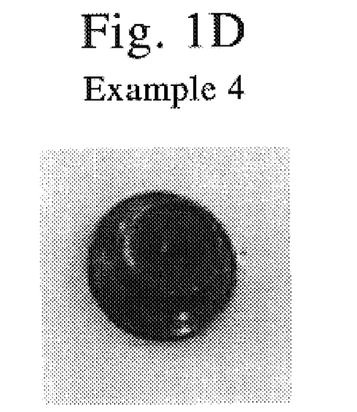
Figure 1E:
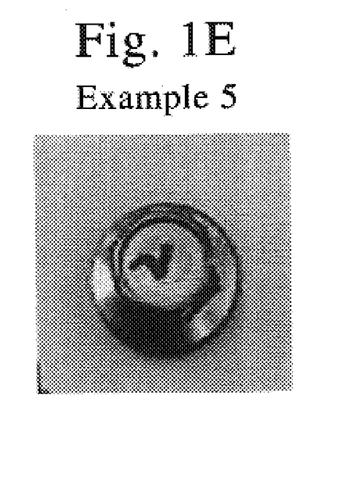
Figure 2A:
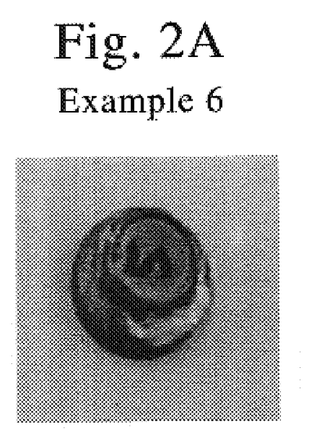
FIG. 2 shows photographs of bolts after salt spray test according to Examples 6 to 9 of the present invention.
Figure 2B:
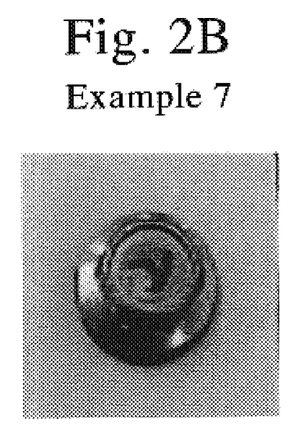
Figure 2C:
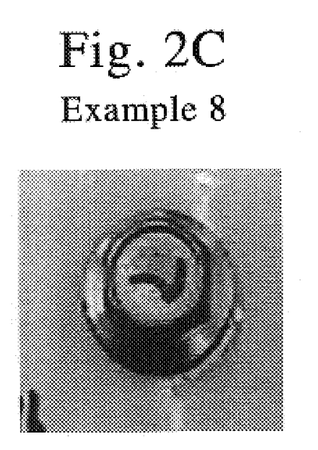
Figure 2D:
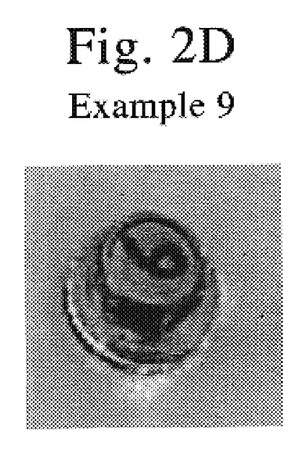
Figure 3A:
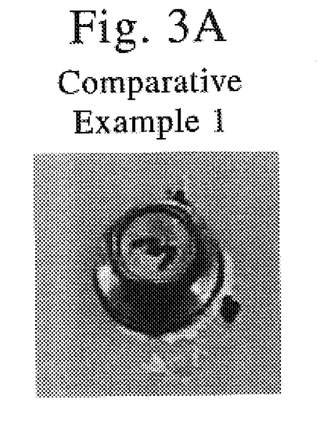
FIG. 3 shows photographs of bolts after salt spray test according to Comparative Examples 1 to 6.
Figure 3B:
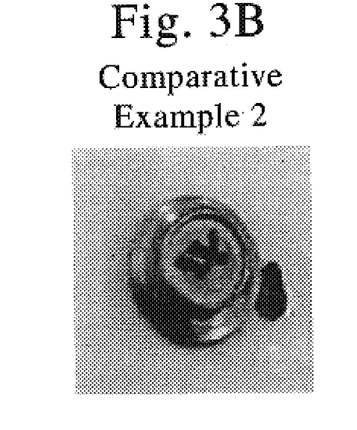
Figure 3C:
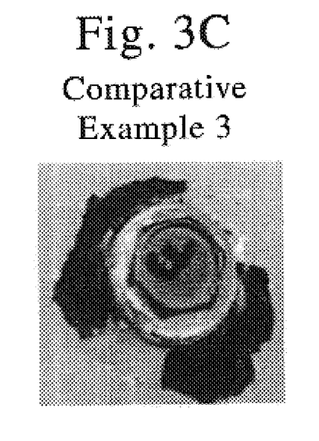
Figure 3D:
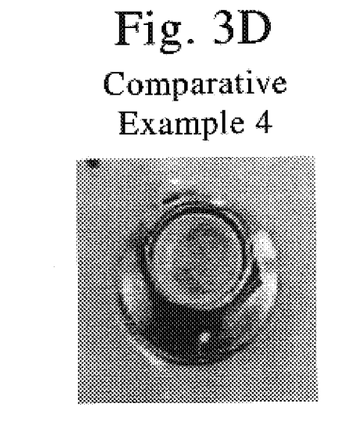
Figure 3E:
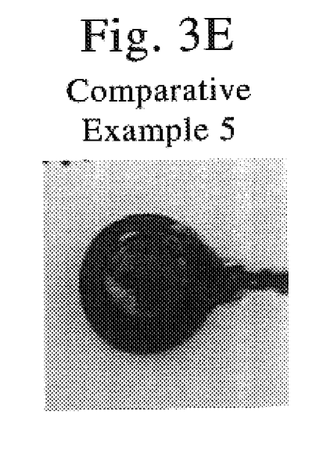
Figure 3F:
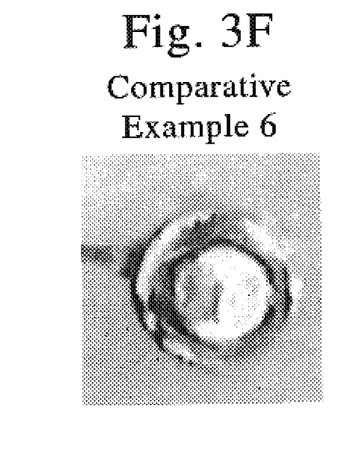
Figure 4A:
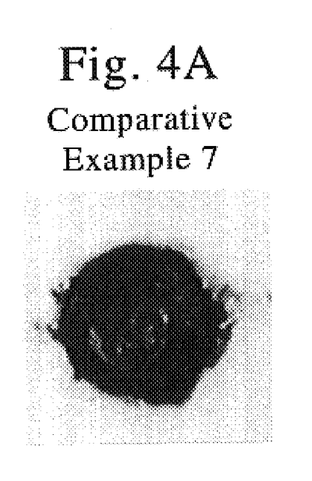
FIG. 4 shows photographs of bolts after salt spray test according to Comparative Examples 7 to 12.
Figure 4B:
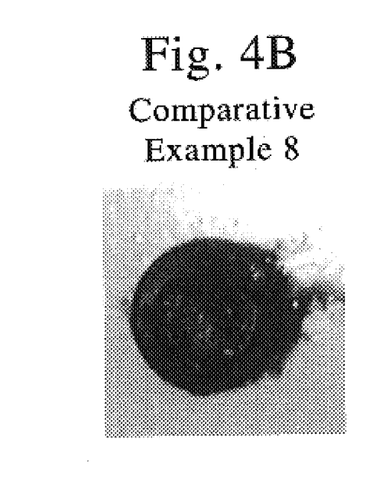
Figure 4C:
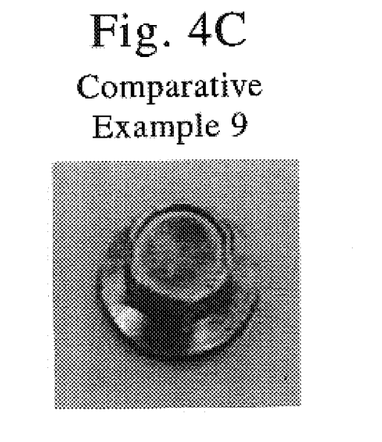
Figure 4D:
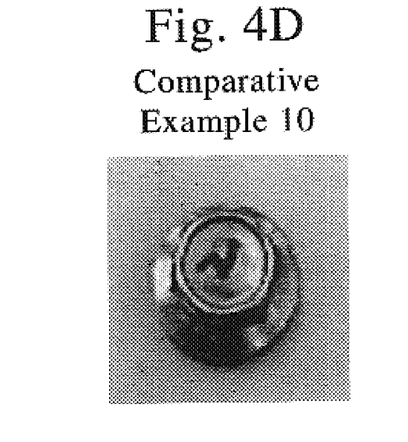
Figure 4E:
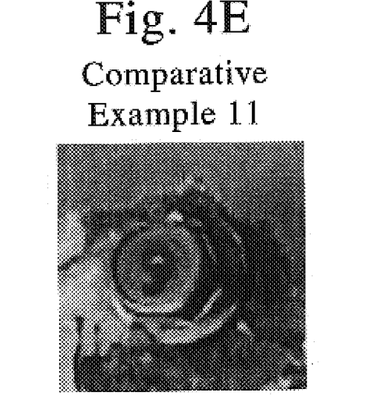
Figure 4F:
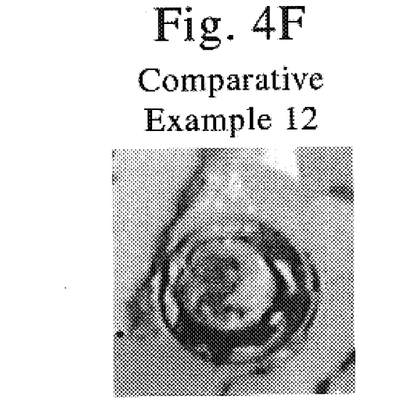
Figure 5A:
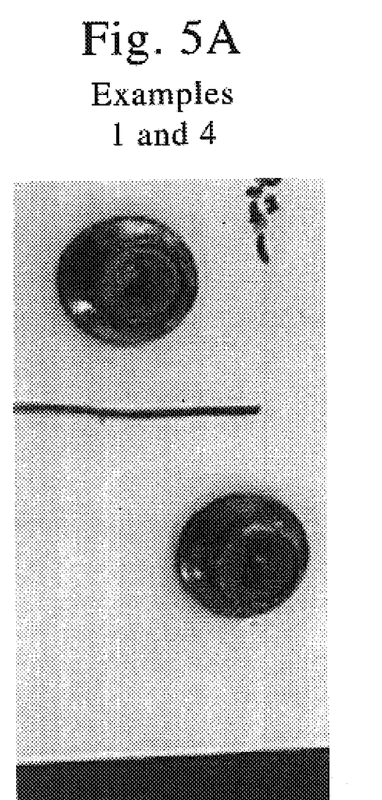
FIG. 5 shows photographs of a wide range of bolts after salt spray test according to Examples 1 and 4, and Comparative Example 8.
Figure 5B:
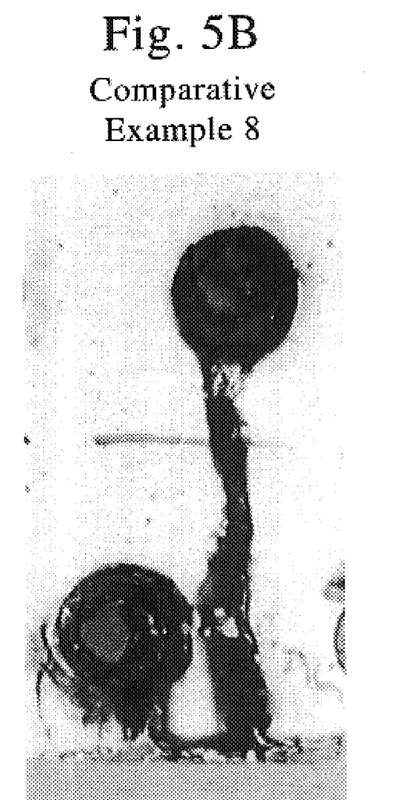
Figure 6:
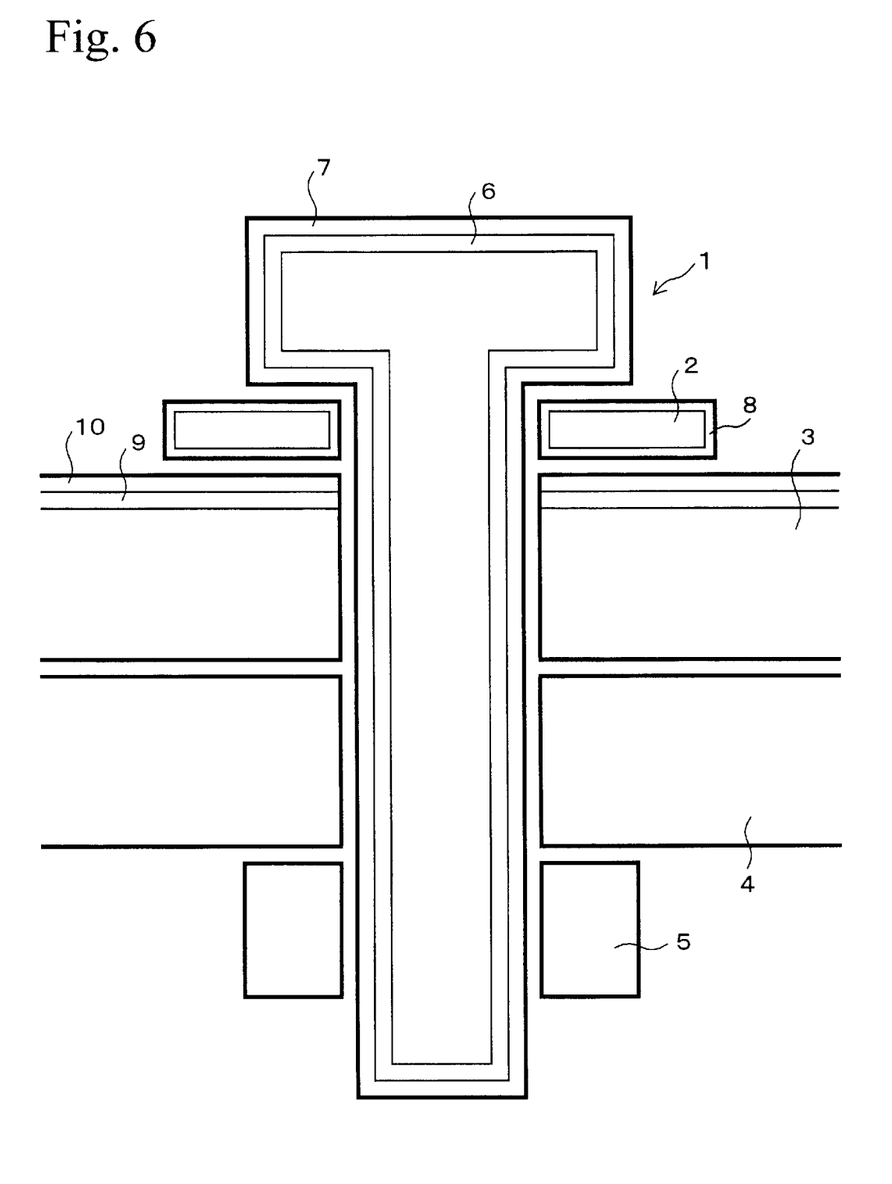
FIG. 6 shows an embodiment of the present invention, including a bolt structure (1), a magnesium alloy member or heterogeneous material member (4), a nut (5), a cationic electrodeposition coating (9), a powder coating (10), aluminum washer (2), a magnesium alloy member (3), an alumite-treated layer (8), zinc-nickel plating layer (6) and the cosmer treatment layer (7).

In Comparative Example 1 in which powder coating was not applied on the magnesium alloy plate and in Comparative Examples 2 and 3 in which no cationic electrodeposition coating was provided, swelling of coat film and electrolytic corrosion occurred near the bolt tightening area of the magnesium alloy plate. In Comparative Example 4 using an iron washer, swelling of coat film occurred near the bolt tightening area of the magnesium alloy plate. In Comparative Examples 5, 6, 7, and 8 using a bolt treated by Dacro treatment, chrome plating, zinc plating, and tin-zinc plating only, respectively, corrosion of the bolt was significant, and corrosion products flowed out to corrode at the edge of the test piece. FIG. 5 shows photographs of test pieces after salt spray test of Examples 1, 4 and Comparative Example 8, and a flow-out state of corrosion products and corrosion at the edge of the test piece were observed in Comparative Example 8.

In Comparative Example 9, since the film thickness of powder coating was 200 $\mu$m which exceeds the upper limit (150 $\mu$m) of the present invention, and in Comparative Example 10, since the resin washer was used, although there was no problem in the coat film, the bolt shaft powers were lowered. In Comparative Example 11, since no washer was used, swelling of coat film and electrolytic corrosion occurred near the bolt tightening area of the magnesium alloy plate. In Comparative Example 12, since no cationic electrodeposition coating was provided and a tin-zinc plated bolt was used, swelling of coat film and electrolytic corrosion occurred near the bolt tightening area of the magnesium alloy plate, and corrosion at the edge of the test piece due to corrosion products of the bolt was also detected.

Overall evaluations of Comparative Examples 1 to 12 were carried out by the above results and the results are shown in Table 3 and Table 4.

In all Comparative Examples, since there were problems when the bolt was tightened to specified torque, the overall evaluations were X.

What is claimed is:

1. A bolt structure for use with a magnesium alloy member, wherein a cationic electrodeposition coating having a film thickness of 15 $\mu$m or more is provided at least on the surface of said magnesium alloy member contacting with a bolt head, a powder coating having a film thickness of 40 to 150 $\mu$m is provided on the surface of said cationic electrodeposition coating, and an alumite-treated aluminum washer is interposed between said bolt head and said magnesium alloy member, wherein a zinc-nickel plating and then cosmer treatment are carried out on said bolt.

2. A bolt structure for use with a magnesium alloy member in accordance with claim 1, wherein the thickness of an alumite layer on said alumite-treated aluminum washer is 10 $\mu$m or more.

3. A bolt structure for use with a magnesium alloy member, wherein a cationic electrodeposition coating having a film thickness of 15 $\mu$m or more is provided at least on the surface of said magnesium alloy member contacting with a bolt head, a powder coating having a film thickness of 40 to 150 $\mu$m is provided on the surface of said cationic electrodeposition coating, and an iron or aluminum alloy washer coated by a cationic electrodeposition coating having a film thickness of 15 $\mu$m or more is interposed between said bolt head and said magnesium alloy member, wherein zinc-nickel plating and then cosmer treatment are carried out on said bolt.

4. A bolt structure for use with a magnesium alloy member in accordance with claim 1, wherein chromate treatment is carried out on said bolt after said zinc-nickel plating and before said cosmer treatment, and any one of chromate treatment, chrome phosphate treatment, and manganese phosphate treatment is carried out on said magnesium alloy member before providing said cationic electrodeposition coating.

5. A bolt structure for use with a magnesium alloy member in accordance with claim 2, wherein chromate treatment is carried out on said bolt after said zinc-nickel plating and before said cosmer treatment, and any one of chromate treatment, chrome phosphate treatment, and manganese phosphate treatment is carried out on said magnesium alloy member before providing said cationic electrodeposition coating.

6. A bolt structure for use with a magnesium alloy member in accordance with claim 3, wherein chromate treatment is carried out on said bolt after said zinc-nickel plating and before said cosmer treatment, and any one of chromate treatment, chrome phosphate treatment, and manganese phosphate treatment is carried out on said magnesium alloy member before providing said cationic electrodeposition coating.

* * * * *